(12) United States Patent
Kim et al.

(10) Patent No.: US 10,165,107 B2
(45) Date of Patent: Dec. 25, 2018

(54) APPARATUS AND METHOD FOR SAFE CONVEYANCE OF NOTIFICATIONS AND/OR ALERTS TO A MOBILE TERMINAL

(75) Inventors: Kyoung Su Kim, San Jose, CA (US); Suk Hwan Yoon, San Jose, CA (US); WonHyoung Lee, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/270,392

(22) Filed: Oct. 11, 2011

(65) Prior Publication Data

US 2013/0090103 A1    Apr. 11, 2013

(51) Int. Cl.
H04M 1/725    (2006.01)
H04M 1/663    (2006.01)
H04M 1/67     (2006.01)

(52) U.S. Cl.
CPC ........ *H04M 1/72577* (2013.01); *H04M 1/663* (2013.01); *H04M 1/67* (2013.01); *H04M 2250/10* (2013.01); *H04M 2250/12* (2013.01)

(58) Field of Classification Search
CPC ....... H04W 4/008; H04W 4/02; H04W 12/12; H04W 4/00; H04W 4/027; H04W 4/046; H04W 52/0251
USPC .............................................. 455/567, 404.2
See application file for complete search history.

(56) References Cited

U.S. PATENT DOCUMENTS

| 6,311,078 | B1* | 10/2001 | Hardouin .................. 455/567 |
| 8,270,933 | B2* | 9/2012 | Riemer et al. .............. 455/345 |
| 2007/0197342 | A1* | 8/2007 | Strenkert .......... F16H 61/66254 477/37 |
| 2008/0139183 | A1* | 6/2008 | Keohane ............. H04M 1/6075 455/414.1 |
| 2008/0255722 | A1* | 10/2008 | McClellan et al. ............. 701/35 |
| 2009/0299622 | A1* | 12/2009 | Denaro ................. G01C 21/32 701/533 |
| 2011/0077032 | A1* | 3/2011 | Correale et al. .............. 455/466 |
| 2011/0095908 | A1* | 4/2011 | Nadeem et al. .............. 340/905 |
| 2011/0111724 | A1* | 5/2011 | Baptiste ..................... 455/404.1 |
| 2011/0314144 | A1* | 12/2011 | Goodman ............. G06Q 10/06 709/224 |
| 2012/0071151 | A1* | 3/2012 | Abramson et al. .......... 455/418 |
| 2012/0238286 | A1* | 9/2012 | Mallavarapu ..... H04M 1/72577 455/456.1 |

(Continued)

FOREIGN PATENT DOCUMENTS

KR    10-2008-0102479 A    11/2008
KR    10-2011-0021669 A    3/2011

(Continued)

*Primary Examiner* — Natasha W Cosme
(74) *Attorney, Agent, or Firm* — Jefferson IP Law, LLP

(57) ABSTRACT

An apparatus and method for a mobile terminal including a display unit to safely convey notifications or alerts to a user of the mobile terminal are provided. The mobile terminal includes a display unit for safely conveying notifications or alerts to a user of the mobile terminal, the mobile terminal comprising, a cellular band transceiver for transmitting and receiving Radio Frequency (RF) signals in a cellular band, a controller for controlling operations of the mobile terminal, at least one sensor for one or more criteria, and a hazardous condition determining unit for determining a hazardous condition exists according to the sensed one or more criteria.

18 Claims, 5 Drawing Sheets

(56) References Cited

U.S. PATENT DOCUMENTS

2013/0096792 A1* 4/2013 Maier .................. B60W 10/02
701/65
2014/0113619 A1* 4/2014 Tibbitts et al. ............... 455/419

FOREIGN PATENT DOCUMENTS

KR    10-2008-0033972 A    4/2011
KR    10-2011-0050275 A    5/2011
WO    WO 2009/105666 A1 *    8/2009  ........... H04W 24/00

* cited by examiner

APPARATUS AND METHOD FOR SAFE CONVEYANCE OF NOTIFICATIONS AND/OR ALERTS TO A MOBILE TERMINAL

BACKGROUND OF THE INVENTION

1. Field of the Invention

The present invention relates to an apparatus and method for safe operation of wireless devices in hazardous conditions. More particularly, the present invention relates to an apparatus and method for providing notifications of incoming phone calls and messages in a safe manner and for providing a notification of an unsafe condition for executing outgoing phone calls and messages.

2. Description of the Related Art

Mobile terminals provide wireless communication between users allowing users to communicate with each other from a variety of locations while in transit. As wireless communication technology has advanced, mobile terminals now provide many additional features beyond simple telephone conversation. For example, mobile terminals are now able to provide additional functions such as an alarm, a Short Messaging Service (SMS), a Multimedia Message Service (MMS), email, video conferencing, a scheduling function, and many other communication services providing great utility to users of the mobile terminals and wireless communication services.

However, many of the mobile communication services provide notifications and/or alerts through the mobile terminal to inform the user of the mobile terminal about incoming messages, phone calls, SMS messages, emails, or other content or communication provided by the mobile communication services. Accordingly, a user of the mobile terminal may become distracted or have their attention diverted from a task at hand to the mobile terminal providing the notifications and/or alerts. For example, the user of a mobile terminal will often carry and/or use the mobile terminal while operating a motor vehicle. In such a case, incoming notifications and/or alerts may distract the attention of the user of the mobile terminal in a manner such that concentration and attention to operating the motor vehicle decreases.

The notifications and/or alerts may be especially unwanted distractions when operation of the motor vehicle requires keen attention, such as when the motor vehicle is travelling at a high rate of speed. A mobile terminal of the related art may disable incoming calls according to a rate of speed the motor vehicle is travelling at. However, many other driving conditions, in addition to a high rate of speed of travel, warrant a high level of attention from the operator of the motor vehicle who is also the user of the mobile terminal. For example, when the operator of the motor vehicle is driving along a curvy road, in a parking lot or in a school zone, the operator of the motor vehicle may desire to not have their attention distracted from the operation of the motor vehicle by incoming notifications and/or alerts or to have the notifications and/or alerts delivered to the mobile terminal in a safe manner. Accordingly, there is a need of an apparatus and method for safely conveying notifications and/or alerts to the mobile terminal in a mobile communication system.

SUMMARY OF THE INVENTION

Aspects of the present invention are to address at least the above-mentioned problems and/or disadvantages and to provide at least the advantages described below. Accordingly, an aspect of the present invention is to provide an apparatus and method for safe conveyance of notifications and/or alerts to a mobile terminal.

In accordance with an aspect of the present invention, a mobile terminal including a display unit for safely conveying notifications or alerts to a user of the mobile terminal is provided. The mobile terminal includes a cellular band transceiver for transmitting and receiving Radio Frequency (RF) signals in a cellular band, a controller for controlling operations of the mobile terminal, at least one sensor for one or more criteria, and a hazardous condition determining unit for determining a hazardous condition exists according to the sensed one or more criteria.

In accordance with another aspect of the present invention, a method safely conveying to a mobile terminal notifications or alerts corresponding to an incoming communication is provided. The method includes determining whether an incoming communication is being received by the mobile terminal, determining whether a current situation is safe for conveying to the mobile terminal the notification or the alert corresponding to the incoming communication and conveying the notification or the alert according to the determination that the current situation is safe for conveying the notification or the alert.

In accordance with another aspect of the present invention, a method for safely transmitting an outgoing communication using a mobile terminal is provided. The method includes determining whether an outgoing communication is being executed by the mobile terminal, determining whether a current situation is safe for executing the outgoing communication, and transmitting the communication according to the determination that the current situation is safe for executing the outgoing communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for safe conveyance of notifications and/or alerts to a mobile terminal in a mobile communication system.

Figure 1:
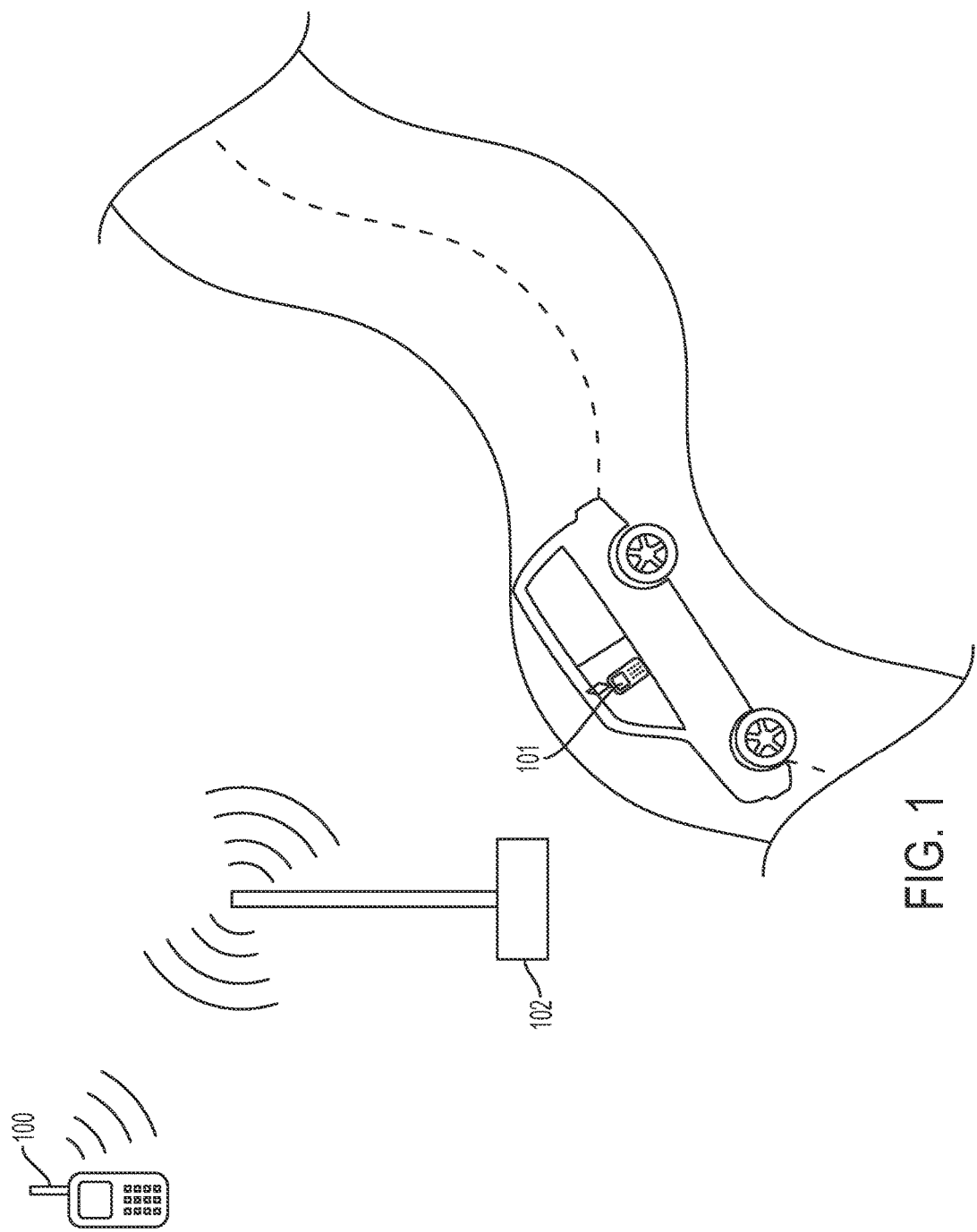
FIG. 1 is an illustration of a mobile communication system providing a safe conveyance of notifications and/or alerts to a mobile terminal according to an exemplary embodiment of the present invention.

FIG. 1 is an illustration of a mobile communication system providing a safe conveyance of notifications and/or alerts to a mobile terminal according to an exemplary embodiment of the present invention.

Referring to FIG. 1, a mobile terminal 100 communicates with another mobile terminal 101 through a base station 102. A user of the mobile terminal 100 generates a call or a text message directed for a user of the mobile terminal 101 and executes a transmission of the call or text message from the mobile terminal 100 to the mobile terminal 101 through the base station 102. The call or text message is received by the mobile terminal 101 and a notification or an alert is conveyed to the user of the mobile terminal 101 by producing a noise through a speaker of the mobile terminal 101, by displaying a graphic message on a display screen of the mobile terminal, by vibrating the mobile terminal 101 or by a variety of other methods alerting the user of the mobile terminal 101 of the incoming call or message.

The mobile communication system described with reference to FIG. 1 may be any one of a variety of mobile communication systems such as a Global System for Mobile Communications (GSM) system, a 3$^{rd}$ Generation Partnership Project (3GPP) system, a Long Term Evolution (LTE) system, a Wireless Interoperability for Microwave Access (WiMax) system, or other similar wireless communication systems. However, further description of the wireless communication system will be avoided for the purpose of brevity. Additionally, although the present exemplary embodiment discusses a transmission and a reception of a phone call or a text message, the present invention is not limited thereto, and a variety of other communications content, such as an email, a Multimedia Messaging Service (MMS) message, a video chat, or a variety of other similar mobile communications may be communicated between the mobile terminal 100 and the mobile terminal 101.

As shown in FIG. 1, a user of the mobile terminal 101 may be operating a motor vehicle and may have the mobile terminal 101 located inside the motor vehicle. Accordingly, in the present exemplary embodiment, and in other embodiments herein, a mobile terminal and a user of the mobile terminal may be collocated inside a motor vehicle operated by the user of the mobile terminal. Accordingly, a user of the mobile terminal and an operator of the motor vehicle are used interchangeably, and the mobile terminal and the motor vehicle are also used interchangeably. In such a case, the mobile terminal 101 may receive the phone call or message generated by the mobile terminal 100 during a time when the motor vehicle may be travelling through hazardous conditions, or operating the motor vehicle during conditions requiring keen or heightened attention of the operator of the mobile vehicle, such as when driving on a curvy road as shown in FIG. 1. During the conditions requiring the heightened attention the operator of the mobile vehicle, who is the same as the user of the mobile terminal 101, may desire to not be alerted or notified about incoming phone calls or messages.

In other words, the user of the mobile terminal 101 may desire to not have the mobile terminal 101 convey the notification or the alert in order to allow the user to more safely operate the motor vehicle. According to the present exemplary embodiment, the mobile terminal 101 does not convey the notification or alert of the phone call or message to the user when the mobile terminal 101 determines that the vehicle is being driven along a curvy road. Rather, the mobile terminal 101 delays conveying the notification or alert of the incoming phone call or message to the mobile terminal 101 until the motor vehicle is operated in less dangerous conditions and the notification or alert may be conveyed in a safer manner.

For example, a gyroscopic sensor of the mobile terminal 101 may sense that a direction of the vehicle is changing rapidly and may determine that the motor vehicle is being operated in a location that requires heightened attention. Upon determining that the operation of the motor vehicle requires heightened attention, the mobile terminal 101 delays notification of the incoming phone call or message until the mobile terminal 101 determines that the motor vehicle is no longer being operated in a location requiring heightened attention, such as when the vehicle is being driven a long a straight road and the gyroscope no longer senses that the direction of the vehicle is changing rapidly.

The mobile terminal 101 may safely convey the notification and/or alert of the incoming phone call or message to the user of the mobile terminal 101. Although in the present exemplary embodiment the mobile terminal 101 uses the gyroscopic sensor to determine if the motor vehicle is being operated in a location requiring heightened attention, the present invention is not limited thereto and other sensors, such as an accelerometer, a light sensor, a noise sensor or other similar sensors may be used to determine if the motor vehicle is being operated in a location requiring heightened attention.

According to another exemplary embodiment of the present invention, a user of the mobile terminal may be blocked from executing an outgoing call on the mobile terminal 101 when it is determined that the operation of the motor vehicle requires heightened attention or that the motor vehicle is being operated during unsafe conditions. For example, the outgoing call may be blocked if the user of the mobile terminal 101 attempts to execute a call while operating the motor vehicle on a curvy road. In such a case, the mobile terminal 101 may sense that a high number changes in a direction of travel of the motor vehicle have occurred in a recent time period, indicating that the motor vehicle is traveling along a curvy road.

The mobile terminal 101 may then determine that the current driving conditions are not safe. If the user of the mobile terminal 101 attempts to execute a phone call during the time when the mobile terminal 101 determines that the driving conditions are not safe, then the mobile terminal may alert the user that the current driving conditions are not safe and prompt the user as to whether to terminate or execute the outgoing call during the unsafe driving conditions.

Figure 2:
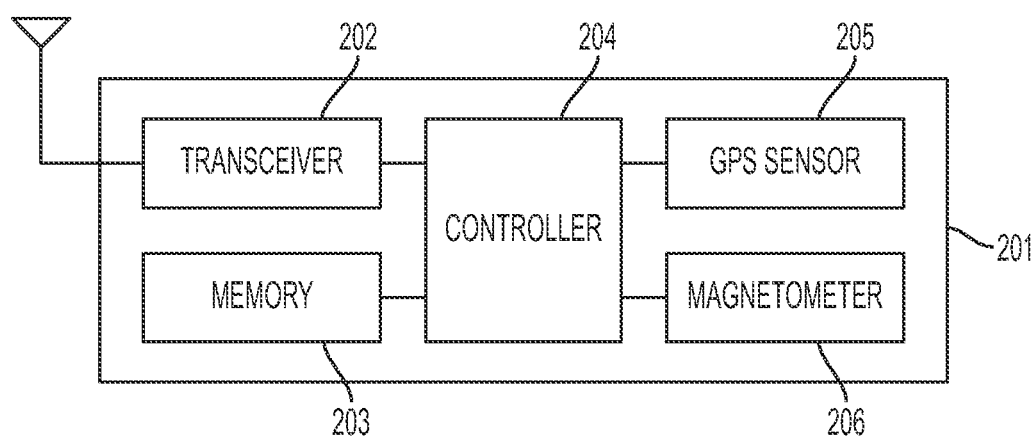
FIG. 2 is an illustration of a mobile terminal according to an exemplary embodiment of the present invention.

FIG. 2 is an illustration of a mobile terminal according to an exemplary embodiment of the present invention.

Referring to FIG. 2, the mobile terminal 201 includes a transceiver 202, a memory 203, a controller 204, a Global Positioning System (GPS) Sensor 205 and a magnetometer 206. However, the present invention is not limited thereto and the mobile terminal 201 may include a variety of sensors to sense current driving conditions. The transceiver 201 transmits and receives Radio Frequency (RF) signals to and from a base station such as the base station 102, as shown in FIG. 1. A controller 203 controls the transceiver 201 in order to transmit and receive the RF signal corresponding to a phone call, a message, or data transmitted from or received by the mobile terminal 201. The controller 203 also controls the GPS sensor 205 in order to sense a location of the mobile terminal and to determine a direction of travel of the mobile terminal 201.

The GPS sensor 205 senses a location of the mobile terminal 201 as GPS coordinates. The controller 204 receives the sensed GPS coordinates in order to determine whether the user of the mobile terminal 201 is operating the motor vehicle in an alert zone, such as a parking lot, a school zone, a complex road, or other similar locations requiring increased attention on the part of the operator of the motor vehicle. The mobile terminal 201 may store a list of these alert zones in the memory 203. The stored list of alert zones may be preprogrammed to be included in the mobile terminal 201, may be input by the user of the mobile terminal 201 by marking locations on a mapping service provided on the mobile terminal, may be downloaded to the mobile terminal 201 or may be acquired by other similar means of inputting the data corresponding to the alert zones on the mobile terminal 201.

In a case where the sensed location is determined to be in an alert zone by the controller 204, the mobile terminal 201 may not convey notifications or alerts corresponding to incoming phone calls, messages or data transmissions. For example, the GPS sensor 205 may sense a location of the motor vehicle to be in the school zone that has a reduced speed limit and that requires heightened attention for operating the motor vehicle due to the amount of children located in the area. The controller 204 receives the GPS coordinates corresponding to the sensed location and compares the received GPS coordinates to a list of locations that are predetermined to be in alert zones.

If the controller 204 determines that the GPS coordinates corresponding to the sensed location is on the list of alert zones, the controller 204 determines that any notifications or alerts corresponding to the incoming phone calls, messages or data communication will not be conveyed to the user of the mobile terminal 201 at a time while the mobile terminal is determined to be in the alert zone. The mobile terminal 201 may store the notifications or alerts in the memory 203 to be delivered at a later time, such as when it is determined that the mobile terminal 201 is no longer travelling through the alert zone.

Although the present exemplary embodiment is discussed with respect to a GPS sensor 205 sensing a location in order to determine if the mobile terminal 201 is in an alert zone, the present invention is not limited thereto. For example, other sensors may be used to determine if the mobile terminal 201 is in an alert zone or if the mobile terminal 201 should not convey the notification or alert to the user of the mobile terminal 201. For example, the mobile terminal 201 may include a magnetometer in order to determine a direction of travel or an amount of change of direction of the motor vehicle. In the case of determining the direction of the travel of motor vehicle, the mobile terminal 201 uses a magnetometer to determine a direction of travel of the motor vehicle.

According to another exemplary embodiment of the present invention, the mobile terminal 201 may determine that the operation of the motor vehicle may require heightened attention according to a direction and time of travel. For example, the mobile terminal 201 determines that the motor vehicle is travelling in a westbound direction according to a bearing sensed by the magnetometer and determines that it is sunset according to a time of the day. In such a case, the mobile terminal 201 may determine that due to the motor vehicle travelling along the westbound direction at that time, the operator of the motor vehicle is being operated in hazardous conditions. For example, the operator of the vehicle may have difficulty in viewing the road or other vehicles because of direct sunlight from the setting sun. Under such conditions, the mobile terminal 201 may delay conveying the notification or alert of the incoming phone call or message until the vehicle is no longer being operated in hazardous conditions.

According to another exemplary embodiment of the present invention, the memory 203 may store a recent history log of the direction of travel corresponding to a time in order to determine if the motor vehicle is travelling along a curvy road. For example, the controller 204 may periodically receive a sensed direction of travel of the mobile terminal 201 from the magnetometer and may store the received sensed direction in a log file stored in the memory 203. The controller 204 may calculate a number of changes in direction within a predetermined amount of time and compare the calculated number of changes to a threshold in order to determine if the motor vehicle is being operated in hazardous conditions. In a case where the calculated number of changes is equal to or exceeds the threshold, the controller 204 does not convey the notifications or alerts corresponding to incoming phone calls or messages to a user of the mobile terminal 201.

Figure 3:
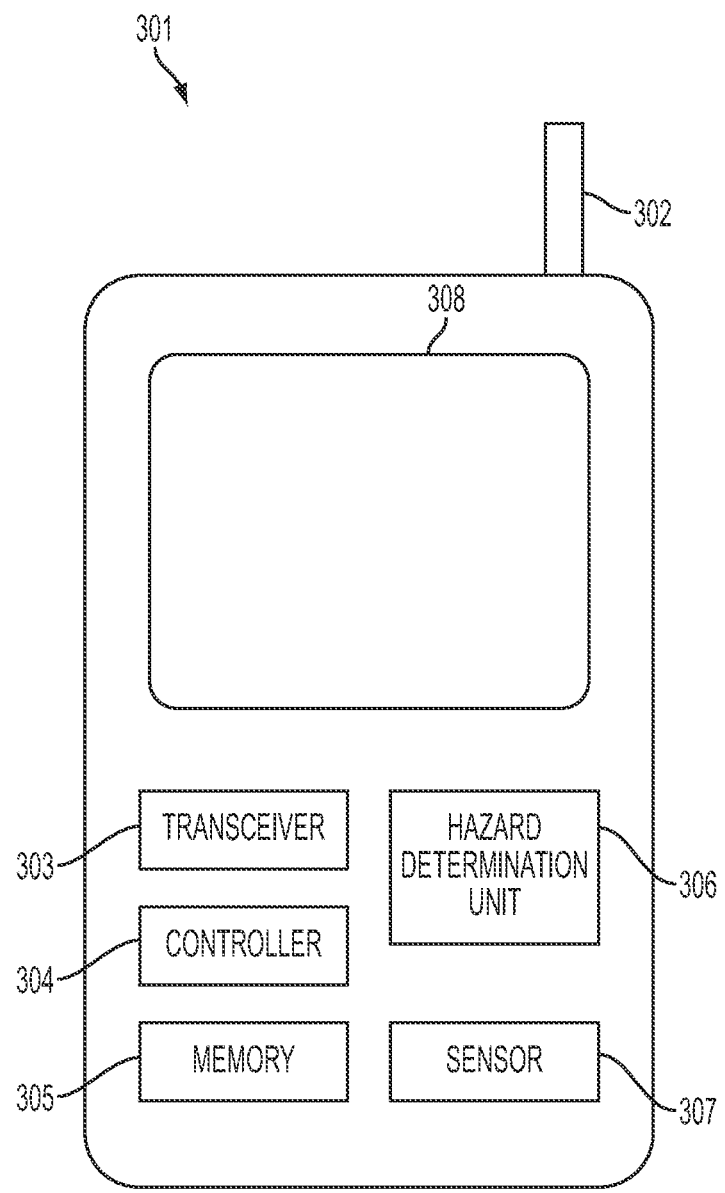
FIG. 3 illustrates a mobile terminal according to an exemplary embodiments of the present invention.

FIG. 3 illustrates a mobile terminal according to an exemplary embodiment of the present invention.

Referring to FIG. 3, a mobile terminal 301 includes an antenna 302 and a transceiver 303 for transmitting and receiving RF signals. The mobile terminal 301 also includes a controller 304, a memory 305, a hazard determination unit 306, a sensor 307 and a display unit 308. The sensor 307 may be a GPS sensor or a magnetometer, as discussed above, with respect to FIG. 2. However, the present invention is not limited thereto, and the sensor 307 may be any suitable sensor included in mobile terminal, such as an accelerometer, a thermometer, a light detector, a compass, a weather alert receiver. Accordingly, the mobile terminal 301 relies upon a variety of sensors to determine driving conditions in which the motor vehicle is being operated.

The sensor 307 detects the current driving conditions in which the motor vehicle is being operated. For example, the sensor 307 may sense at least one of a driving speed, a location of the motor vehicle with respect to an alert zone, a slope of the road, an amount of curviness to a road, weather conditions, an amount of acceleration or deceleration of the motor vehicle, a time of day, an amount of light and a direction of travel. The sensor 307 may be at least one of the sensors noted in the above paragraph in order to sense the factors that contribute to determining the current driving conditions.

The sensor 307 provides the sensed data to the hazard determination unit 306 which determines whether the sensed data indicates a hazardous driving condition. In the case of the sensor 307 including a weather alert receiver, a weather alert indicating severe thunderstorms are occurring in a specific area may be received by the sensor 307. The sensor 307 provides the weather alert to the hazard determination unit 306.

The hazard determination unit 306 compares the weather alert including the specific area of the occurring thunderstorms and compares the alert to a present location or an area of the motor vehicle according to the GPS sensor. If the specific area of the occurring thunderstorms coincides with the present location or the area of the motor vehicle, then the hazard determination unit 307 determines that there is hazardous driving condition presently. The controller 304 delays the conveying of notifications and alerts corresponding to incoming phone calls and messages until there is no longer the hazardous driving condition. If there is no hazardous driving condition, the controller 304 displays the phone call or message notification or alert on the display unit 308 or generates an audible alert signal informing the user of the mobile terminal 301 of the phone call or the notification.

Figure 4:
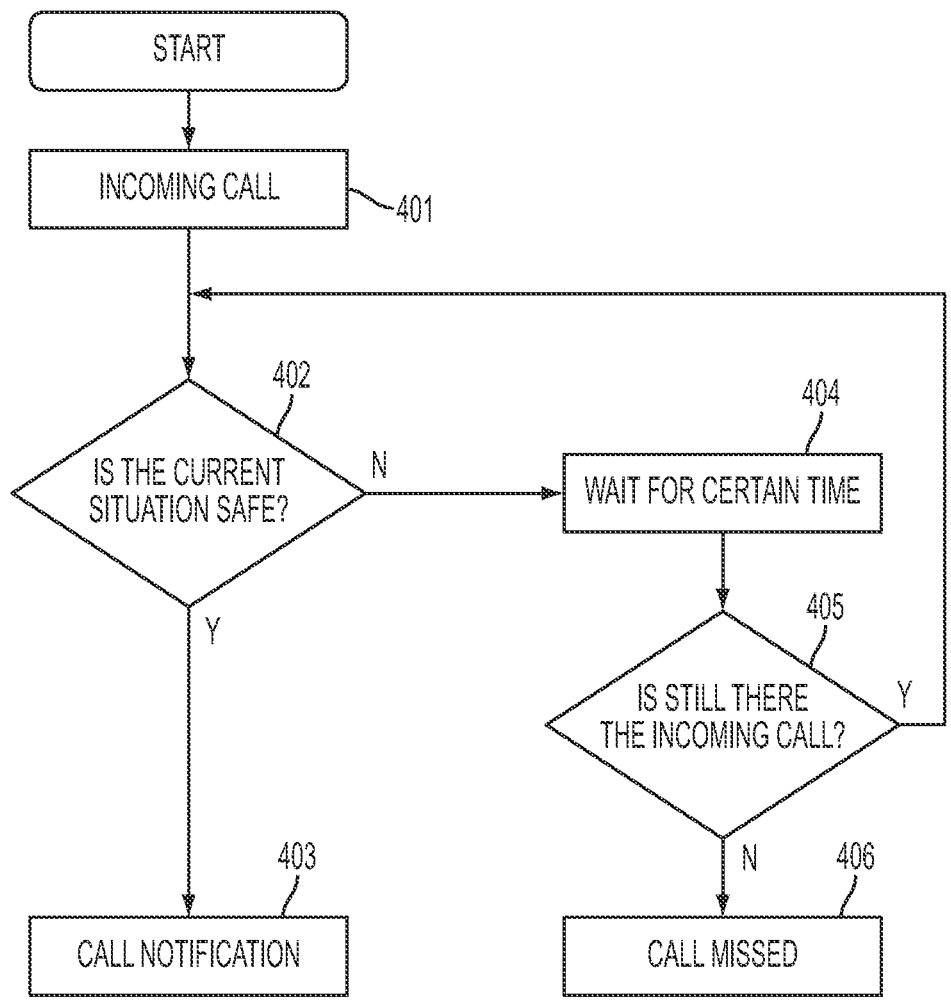
FIG. 4 is a flowchart showing a method of safely conveying notifications and/or alerts to a mobile terminal according to an exemplary embodiment of the present invention.

FIG. 4 is a flowchart showing a method of safely conveying notifications and/or alerts to a mobile terminal according to an exemplary embodiment of the present invention.

Referring to FIG. 4, while a user of the mobile terminal is operating a motor vehicle or performing other similar actions requiring heightened attention, the mobile terminal receives an incoming call in step 401. Next, in step 402, it is determined whether the current situation is safe so as to convey a notification or alert to a user of the mobile terminal. If the current situation is safe, in step 403, a call notification is conveyed to the user of the mobile terminal. If the current situation is not safe, then, in step 404, the mobile terminal waits a predetermined amount of time.

After the predetermined amount of time has lapsed in step 404, next in step 405, it is determined whether the incoming call is still attempting to connect to the mobile terminal. If there is no longer an incoming call, in step 406, the mobile terminal conveys a notification or an alert to the user of the mobile terminal informing the user of the missed call. The notification or the alert of the missed call may be conveyed at a time when the current situation is safe. When there is still an incoming call, the mobile terminal returns to step 402 in order to determine whether the current situation is safe so as to convey the notification or the alert to the user of the mobile terminal and proceeds along the operations described above.

Figure 5:
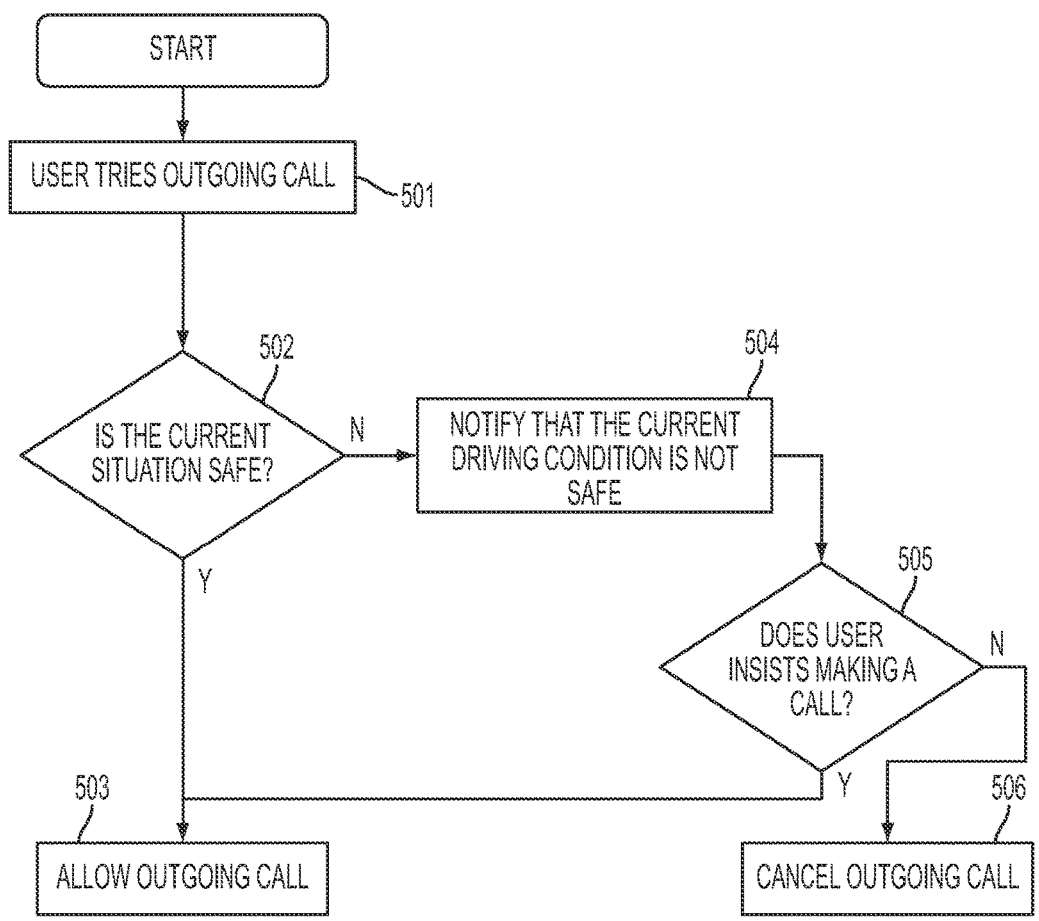
FIG. 5 is a flowchart showing a method of safely conveying notifications and/or alerts to a mobile terminal according to an exemplary embodiment of the present invention.

FIG. 5 is a flowchart showing a method of safely conveying notifications and/or alerts to a mobile terminal according to an exemplary embodiment of the present invention.

Referring to FIG. 5, while a user of the mobile terminal is operating a motor vehicle or performing other similar actions requiring heightened attention, the user of the mobile terminal may attempt to execute an outgoing call is step 501. In step 502, it is determined whether a current situation is safe with respect to executing the outgoing call while operating the motor vehicle or performing the action requiring heightened attention. If the current situation is safe, then in step 503, the outgoing call is executed.

If the current situation is not safe, then in step 504, the user is notified that the current situation is not safe with respect to executing the outgoing call. Next, in step 505, it is determined whether the user elects to execute the call in the current situation determined to not be safe. For example, the user may be provided a prompt on a display screen allowing the user to execute or terminate the outgoing call. If the user elects to execute the call, then in step 503, the outgoing call is executed. If the user elects to not execute the call, then, in step 506, the outgoing call is cancelled.

The mobile terminal may determine that the driving situation is unsafe, or in other words, that operation of the motor vehicle requires a heightened amount of attention using a variety of sensors and according to a variety of determinations. For example, it may be determined that a motor vehicle speed exceeds a predetermined speed threshold, or it may be determined that an amount of a change of a compass bearing, or in other words, a change in a direction of travel of the motor vehicle, exceeds a swerve threshold, indicating that the motor vehicle is on a curvy road. Also, it may be determined that an amount of acceleration or deceleration of the speed of the motor vehicle, i.e., the motor vehicle is accelerating or braking rapidly, exceeds an acceleration/deceleration threshold indicating a large change of the motor vehicle's speed.

Furthermore, it may be determined that a slope of a road along which the motor vehicle is travelling exceeds a slope threshold, thus indicating that the motor vehicle is travelling along a hilly or a steep road. It may also be determined that a motor vehicle is travelling through an alert zone, such as a school zone, a construction zone, a parking lot, a hospital zone, or other similar zones. Additionally, it may be determined that the motor vehicle is being driven in a direction facing a sunset or a sunrise, or that a vehicle is being operated during inclement weather, such as a rain or snow storm, or in poor visibility conditions. Furthermore, other similar indicators, sensors or conditions may be used to determine whether the motor vehicle is being operated in unsafe conditions.

The exemplary embodiments of the present invention provide a mobile terminal that is able to determine whether a motor vehicle that is being operated by a user of the mobile terminal is currently in an unsafe driving situation. The mobile terminal, according to the exemplary embodiments described above, may delay a notification or an alert of an incoming phone call, text message, data message, or other form of communication received during the unsafe driving situation. Also, the mobile terminal may block transmission of an outgoing phone call, text message, data message, or other form of communication that the user attempts to transmit during the unsafe driving situation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal including a display unit for safely conveying notifications using the mobile terminal, the mobile terminal comprising:
   a storage configured to store instructions therein;
   a cellular band transceiver for transmitting and receiving radio frequency (RF) signals in a cellular band;
   at least one sensor configured to sense one or more criteria, the one or more criteria sensed from current driving conditions of a motor vehicle, the current driving conditions comprising at least one of a weather condition, or an amount of light; and
   at least one processor;
   wherein, upon execution of the instructions, the at least one processor is configured to:
      determine that a hazardous condition exists according to the sensed one or more criteria, and
      store hazardous condition data, including hazardous condition thresholds,
   wherein the determining of the existence of the hazardous condition comprises comparing data of the sensed one or more criteria with respective ones of the hazardous condition thresholds stored in the mobile terminal to determine whether the hazardous condition exists based on the hazardous condition thresholds,
   wherein the hazardous condition thresholds include a threshold applied to the weather condition, or the amount of light, and
   wherein the at least one processor is further configured to withhold a notification or an alert of an incoming communication according to a sensed location of the mobile terminal corresponding to a predesignated safety zone location stored in memory.

2. The mobile terminal of claim 1, wherein the one or more criteria further comprises at least one of a traveling speed, an amount of acceleration, or an amount of deceleration.

3. The mobile terminal of claim 1, wherein the at least one sensor comprises at least one of an accelerometer, a magnetometer, a global positioning system (GPS) sensor, a compass, a light sensor or a thermometer.

4. The mobile terminal of claim 1, wherein the at least one processor is further configured to withhold the notification or the alert of the incoming communication when the at least one processor determines that a hazardous condition exists.

5. The mobile terminal of claim 4, wherein the incoming communication comprises at least one of an incoming phone call, video call, text message, email or data communication.

6. The mobile terminal of claim 1, wherein the at least one processor is further configured to disable outgoing communication from the mobile terminal when the at least one processor determines that a hazardous condition exists.

7. The mobile terminal of claim 6, wherein the outgoing communication comprises at least one of an outgoing phone call, video call, text message, email or data communication.

8. A method for safely conveying to a mobile terminal a notification or an alert corresponding to an incoming communication, the method comprising:
   determining whether an incoming communication is being received by the mobile terminal;
   determining whether a speed of a motor vehicle containing the mobile terminal exceeds a speed threshold;
   when it is determined that the speed of the motor vehicle exceeds the speed threshold, determining whether another threshold is exceeded;
   when it is determined that the other threshold is exceeded, determining that a current driving situation of the motor vehicle is unsafe; and
   conveying to the mobile terminal the notification or the alert corresponding to the incoming communication when it is determined that the current driving situation of the motor vehicle is safe,
   wherein the other threshold applies to sensed current driving conditions, and comprises at least one of, a weather condition, or an amount of light, and
   wherein when the speed threshold is exceeded and at least one of the other thresholds is exceeded determining that the current driving situation is unsafe, and waiting a predetermined amount of time before determining again whether the incoming call or communication is being received by the mobile terminal after determining that the current driving situation is unsafe.

9. The method of claim 8, wherein when the speed threshold is not exceeded and all of the other thresholds are not exceeded it is determined that the current driving situation is safe.

10. The method of claim 8, further comprising determining again whether the current driving situation is safe for conveying the notification or the alert to the mobile terminal in response to the incoming communication still being received by the mobile terminal.

11. The method of claim 8, further comprising conveying a missed call or the notification or the alert using the mobile terminal when it is determined that the incoming communication is not being received by the mobile terminal.

12. The method of claim 9, wherein the conveying of the notification or the alert comprises conveying the notification or the alert using the mobile terminal upon determining that the current driving situation is safe.

13. A method for safely transmitting an outgoing communication using a mobile terminal, the method comprising:
   determining that an outgoing communication is being executed by the mobile terminal;
   determining that a speed of a motor vehicle containing the mobile terminal exceeds a speed threshold;
   when the speed of the motor vehicle is determined to exceed the speed threshold:
      determining that current driving situation of the motor vehicle containing the mobile terminal is unsafe,
      blocking the outgoing communication, and
      determining whether another threshold is exceeded, and when the other threshold is not exceeded:
         determining that the current driving situation of the motor vehicle containing the mobile terminal is safe, and
      transmitting the outgoing communication,
   wherein the other threshold comprises at least one of, a weather condition, or an amount of light, and
   wherein, when a sensed location of the mobile terminal corresponds to a predesignated safety zone location, the outgoing communication is blocked and a notification of an incoming communication is withheld.

14. The method of claim 13, wherein when the speed threshold is exceeded and at least one of the other thresholds is exceeded it is determined that the current driving situation is unsafe.

15. The method of claim 14, further comprising:
   conveying an alert, using the mobile terminal, the alert being that the current driving situation is unsafe; and
   determining whether the outgoing communication has been executed in the current driving situation determined to be unsafe.

16. The method of claim 15 further comprising transmitting the outgoing communication in the current driving situation determined to be unsafe.

17. The method of claim 13, wherein when the speed threshold is not exceeded and all of the other thresholds are not exceeded it is determined that the current driving situation is safe.

18. The method of claim 17, further comprising allowing the transmitting of the communication when it is determined that the current driving situation is safe.

* * * * *